(12) United States Patent
Koch

(10) Patent No.: US 7,979,510 B2
(45) Date of Patent: *Jul. 12, 2011

(54) METHOD, SYSTEM, AND STORAGE MEDIUM FOR PROVIDING AUTOMATED EXECUTION OF PRE-DEFINED EVENTS

(75) Inventor: Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/961,449

(22) Filed: Dec. 20, 2007

(65) Prior Publication Data

US 2008/0098408 A1    Apr. 24, 2008

Related U.S. Application Data

(63) Continuation of application No. 10/686,213, filed on Oct. 14, 2003, now Pat. No. 7,315,882.

(51) Int. Cl.
G06F 13/00    (2006.01)
(52) U.S. Cl. ......... 709/219; 709/206; 709/224; 719/318
(58) Field of Classification Search .................. 709/217, 709/219, 223, 225; 719/318
See application file for complete search history.

(56) References Cited

U.S. PATENT DOCUMENTS

| | | | |
|---|---|---|---|
| 5,903,845 A * | 5/1999 | Buhrmann et al. | 455/461 |
| 6,219,694 B1 | 4/2001 | Lazaridis et al. | |
| 6,725,461 B1 * | 4/2004 | Dougherty et al. | 725/40 |
| 6,732,103 B1 * | 5/2004 | Strick et al. | 1/1 |
| 6,769,120 B1 | 7/2004 | Rodriguez | |
| 6,842,628 B1 * | 1/2005 | Arnold et al. | 455/556.2 |
| 2001/0049617 A1* | 12/2001 | Berenson et al. | 705/8 |
| 2002/0161833 A1 | 10/2002 | Niven et al. | |
| 2003/0093706 A1* | 5/2003 | Cronin | 714/1 |
| 2004/0143472 A1 | 7/2004 | Estrada et al. | |
| 2004/0243922 A1 | 12/2004 | Sirota et al. | |
| 2004/0268215 A1* | 12/2004 | Trossen et al. | 715/500 |

* cited by examiner

*Primary Examiner* — Viet Vu
(74) *Attorney, Agent, or Firm* — Cantor Colburn LLP

(57) ABSTRACT

Embodiments relate to a method, system, and storage medium for providing automated execution of pre-defined events over a network. The method includes receiving a profile for a requestor of an event to be executed. The profile includes one or more of a personal identifier, a communications address of the requester, and an event recipient identifier for identifying an individual or entity that is the object of the event. The method further includes receiving events defined for execution at a future time, which includes receiving a unique command for identifying the predefined event, and receiving an identifier for a target entity to which a request for event execution will be sent. The method also includes receiving a request to execute at least one of the events and executing the at least one of the events on behalf of the requestor.

17 Claims, 6 Drawing Sheets

METHOD, SYSTEM, AND STORAGE MEDIUM FOR PROVIDING AUTOMATED EXECUTION OF PRE-DEFINED EVENTS

CROSS REFERENCE TO RELATED APPLICATIONS

This application is a continuation application of U.S. Ser. No. 10/686,213 filed Oct. 14, 2003, which is now issued U.S. Pat. No. 7,315,882, the contents of which are incorporated by reference herein in their entirety.

BACKGROUND OF THE INVENTION

Embodiments of the present invention relates generally to voice and digital communications services, and more particularly, the invention relates to a method, system, and storage medium for providing automated execution of pre-defined events over a communications network.

The growing popularity of the Internet and the associated Internet protocol (IP) technology has carried over to the cellular industry which has embraced IP as the networldng architecture of choice for creating and implementing new applications and service offerings. Recent trends toward open, packet-based wireless technology has facilitated an extraordinary expansion of global, wireless subscribers which continues to grow each year.

This third-generation (3G) technology provides network operators and third-party content and service providers with vast potential for delivering new services and value-added content to mobile cellular subscribers that can be personalized in ways never before thought possible.

Often times there is a need to quickly execute an electronic event such as a commerce transaction or send a message or reminder to oneself or others during a time when it is not possible to do so or is not convenient. Some executable events are repetitious in that an individual must repeat a sequence of identical steps over an extended period of time. Other executable events are scheduled for execution at a later time. There are also many specific electronic events that are virtually universal in their application to individuals regardless of geography, business profession, age, etc., such as making a reservation for transportation, sending flowers, purchasing goods, sending an email, calendaring a meeting, etc. Currently, there exists no quick and simple way to execute these events or for pre-defining more personalized events for execution.

What is needed, therefore, is a convenient way to define, schedule, and execute an electronic event and receive acknowledgement upon its execution.

SUMMARY OF THE INVENTION

Embodiments of the invention relate to a method, system, and storage medium for providing automated execution of pre-defined events over a network. The method includes receiving a profile for a requester of an event to be executed. The profile includes one or more of a personal identifier, a communications address of the requester, and an event recipient identifier for identifying an individual or entity that is the object of the event. The method further includes receiving events defined for execution at a future time, which includes receiving a unique command for identifying the predefined event, and receiving an identifier for a target entity to which a request for event execution will be sent. The method also includes receiving a request to execute at least one of the events and executing the at least one of the events on behalf of the requester.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

The automated event execution service provides a means to select an event from a pre-defined set of events and receive acknowledgement upon its execution. A user may also customize the events to accommodate personal preferences and business requirements. The automated event execution service may be implemented using various communications methods including telephone, email, text messaging, or other communications means.

Figure 1:
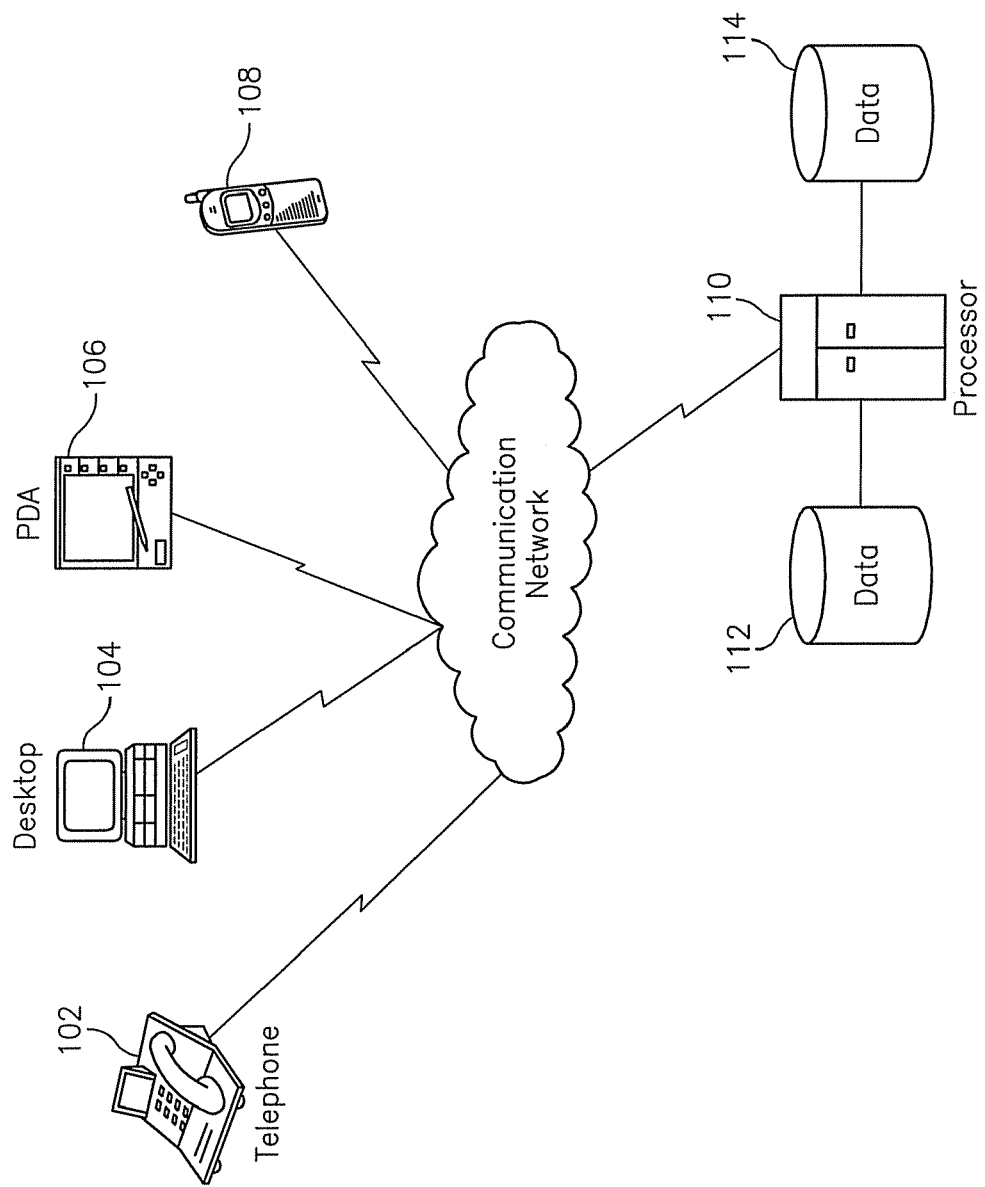
FIG. 1 is a block diagram of a system upon which the automated event execution service is implemented in exemplary embodiments.

The automated event execution service is executed via a communications network as shown in the system 100 of FIG. 1. FIG. 1 depicts a variety of communications devices for which the automated event execution service may be applied. A user schedules an event execution via one of communications devices 102-108. Communications devices shown in FIG. 1 include a wireline telephone 102, a personal desktop computer 104, a personal digital assistant (PDA) 106, and a wireless mobile telephone 108. It will be understood that other types of communications devices may also be utilized in order to realize the benefits of the invention.

Wireline telephone 102 refers to a traditional wired telephone utilizing Public Switched Telephone Network (PSTN) that carries analog voice data.

Personal desktop computer 104 may comprise a desktop, laptop, or other similar general-purpose computing device.

PDA 106 comprises a mobile computing device with networking capability such as a web browser and an Internet Service Provider subscription for allowing PDA 106 to communicate digitally with other communications devices.

Wireless mobile telephone 108 communicates via a cell tower and mobile switching center (not shown), which, in turn, communicates to other networks via a central office (not shown). The telecommunications infrastructure required for enabling communications devices 102-108 are well known and will be understood by those skilled in the art.

Host system 110 executes the automated event execution service and comprises any suitable high-speed microprocessor capable of handling the volume of activities provided by the features and functions of the automated event execution service and its subscriber base. Server 110 is accessible to the Internet and includes a security feature or firewall (not shown) in order to protect the integrity of the data stored therein.

The automated event execution service may be executed by a third party network provider or application service provider (ASP) and a portion of the automated event execution service may be resident in memory on a subscriber's communications device as described further herein.

Customer profile database 112 stores profile data for subscribers of the automated event execution service. Profile data includes personal information about the subscriber including one or more phone numbers, text addresses, communications addresses, etc. Customer profile database 112 further stores contact information for identifying individuals, businesses, organizations, or other entities that are provided by the subscriber and/or the automated event execution service. Contact information includes target entities and event recipients. A target entity refers to the entity or individual from which an action is requested for execution. For example, a target entity may be a florist that the subscriber engages in business with on a regular or periodic basis. An event recipient refers to an entity or individual for which the action or event is executed. Using the example above, an event recipient may be the subscriber's spouse or other family member for which the subscriber would like to send a floral arrangement. The contact information for the target entities and event recipients may include a subject name, communications addresses such as phone number, email address, postal address, URL, pager, instant message address, or similar types of contact information. Contact information is customizable by the subscriber as desired and will typically include individuals or entities for which the subscriber has frequent or recurrent contacts. The customer profile database 112 also stores one or more unique identifiers (also referred to as personal identifiers) for the subscriber that are used to associate the subscriber with the profile.

Event database 118 stores a selection of event types that are available to a subscriber and include a variety of actions or transactions selectable by the subscriber. Examples of events include meetings, reservations, reminders, purchases, and any other activity that can be conducted over a network. A subscriber may also add new events to his/her personal pre-defined event list.

Figure 2:
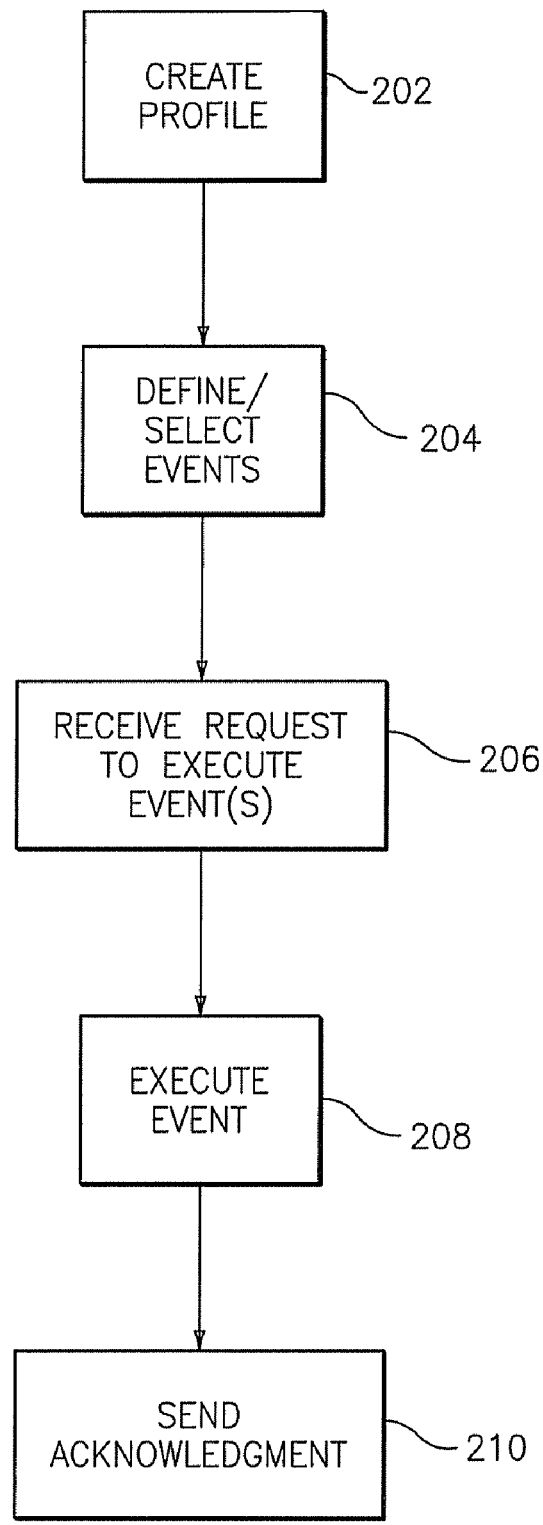
FIG. 2 is a flowchart describing the process of implementing the features of the automated event execution service in exemplary embodiments.
Figure 3:
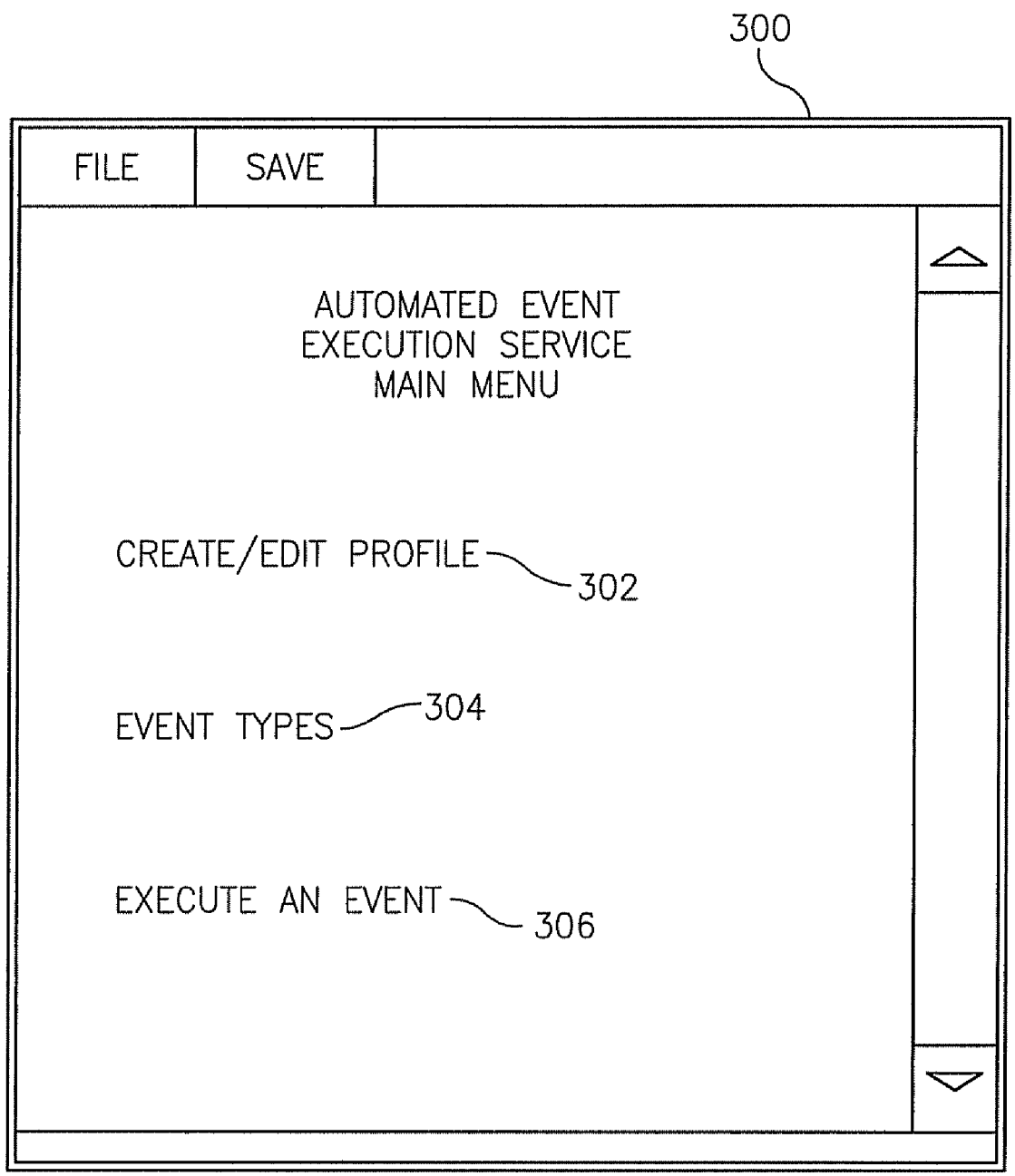
FIG. 3 is a sample screen display on a communications device illustrating menu options available to a user that is implementing the automated event execution service in exemplary embodiments.

The automated event execution service can be implemented in a variety of communications environments including, for example, a data network such as the Internet, or a voice communications network. A user who is interested in subscribing to the service may register by providing the information requested as shown in the computer screen windows of FIGS. 3-6. FIG. 2 describes the process of creating a profile and setting up a pre-defined event list utilizing the automated event execution service.

Figure 4:
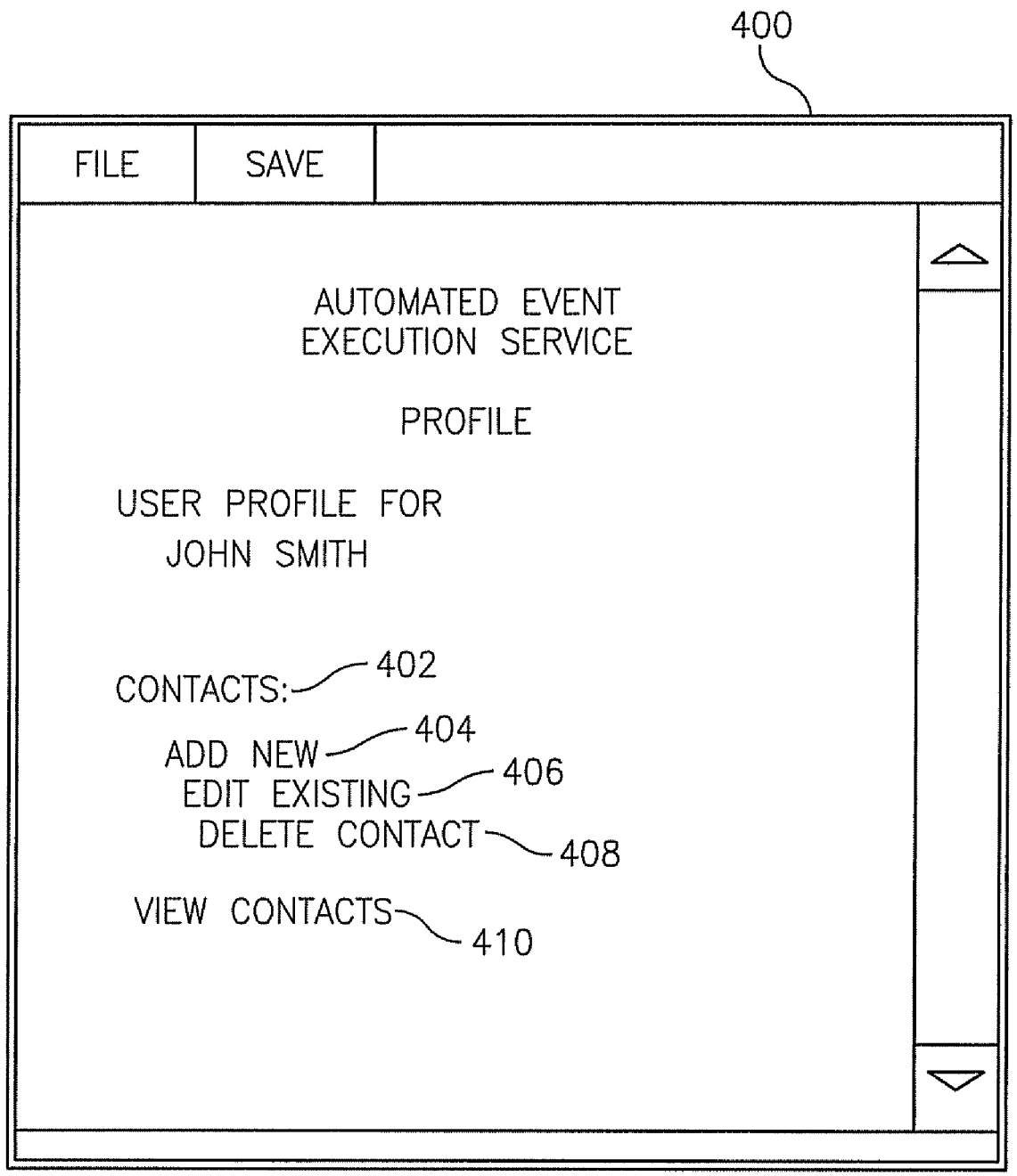
FIG. 4 is a sample screen display on a communications device illustrating how a user creates, edits, deletes, and views contact information in exemplary embodiments.
Figure 5:
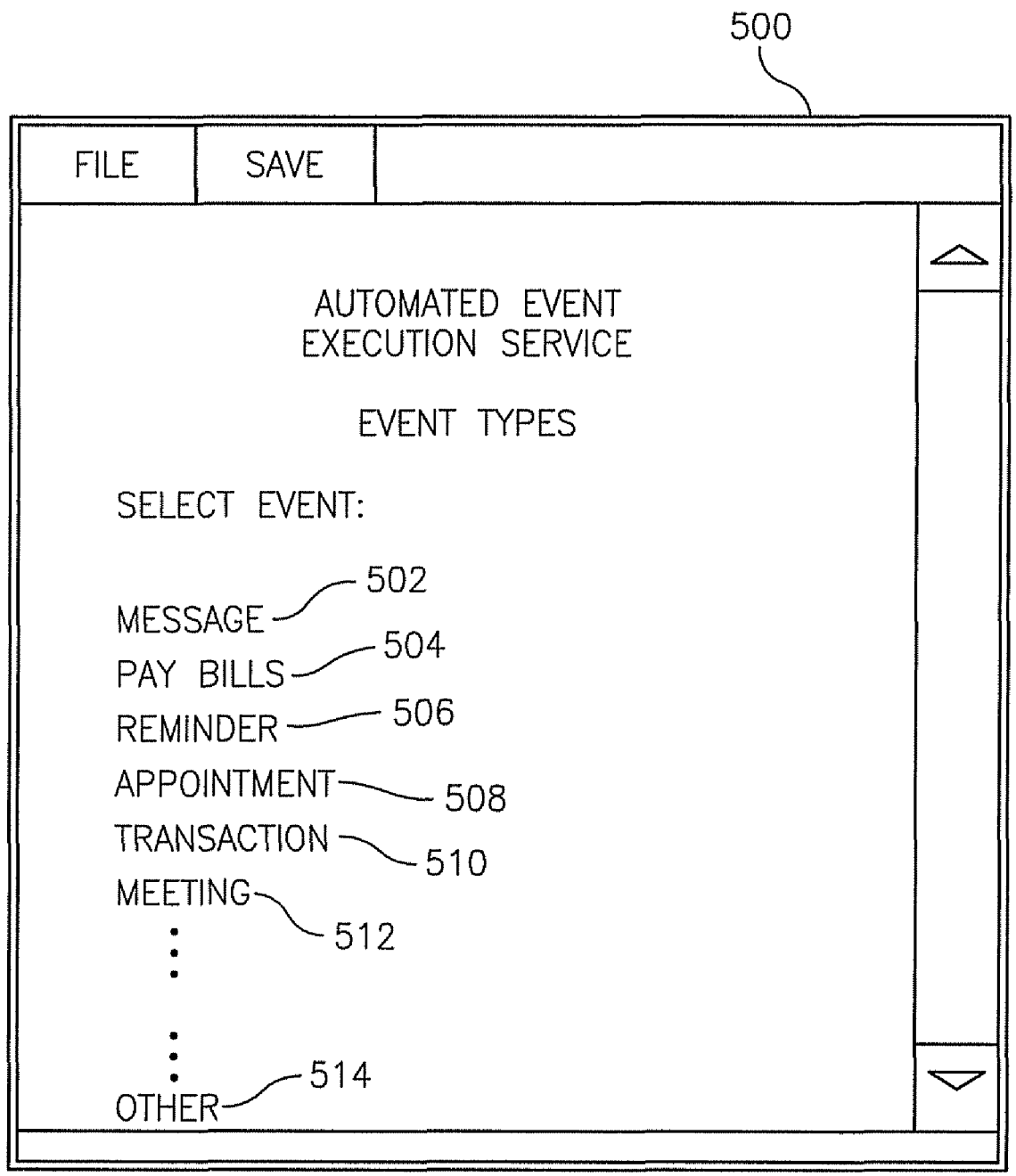
FIG. 5 is a sample screen display on a communications device illustrating event types available to a user in exemplary embodiments.

The automated event execution service provides a user interface and main menu (see FIG. 3 generally) that allows a user who has registered or subscribed to the automated event execution service to access the tool. The options provided by the main menu of screen 300 include 'create/edit profile' 302, 'event types' 304, and 'execute event' 306. The automated event execution service creates a profile for the subscriber as described herein. The subscriber (also referred to herein as "requester") selects option 302 on the main menu screen 300 at step 202. A sample profile screen 400 is shown in FIG. 4. In profile screen 400, a subscriber can add new contacts 404, edit existing contacts 406, delete a contact 408, or view existing contacts 410. Contact options 402 refer to both target and recipient contacts. To add a contact, the subscriber selects option 404 from profile screen 400 and a series of information fields are provided to the subscriber requesting specific information about the contact (not shown). The subscriber enters information into data fields provided in profile screen 400 such as the name of the contact, the contact type (target or recipient), and one or more communications addresses for communicating with the contact. A unique identifier is associated with the contact entered. A personal identifier is assigned to the requestor to associate the requestor with the profile created. Once submitted, the profile is received at host system 110 and stored in profile database 112.

Figure 6:
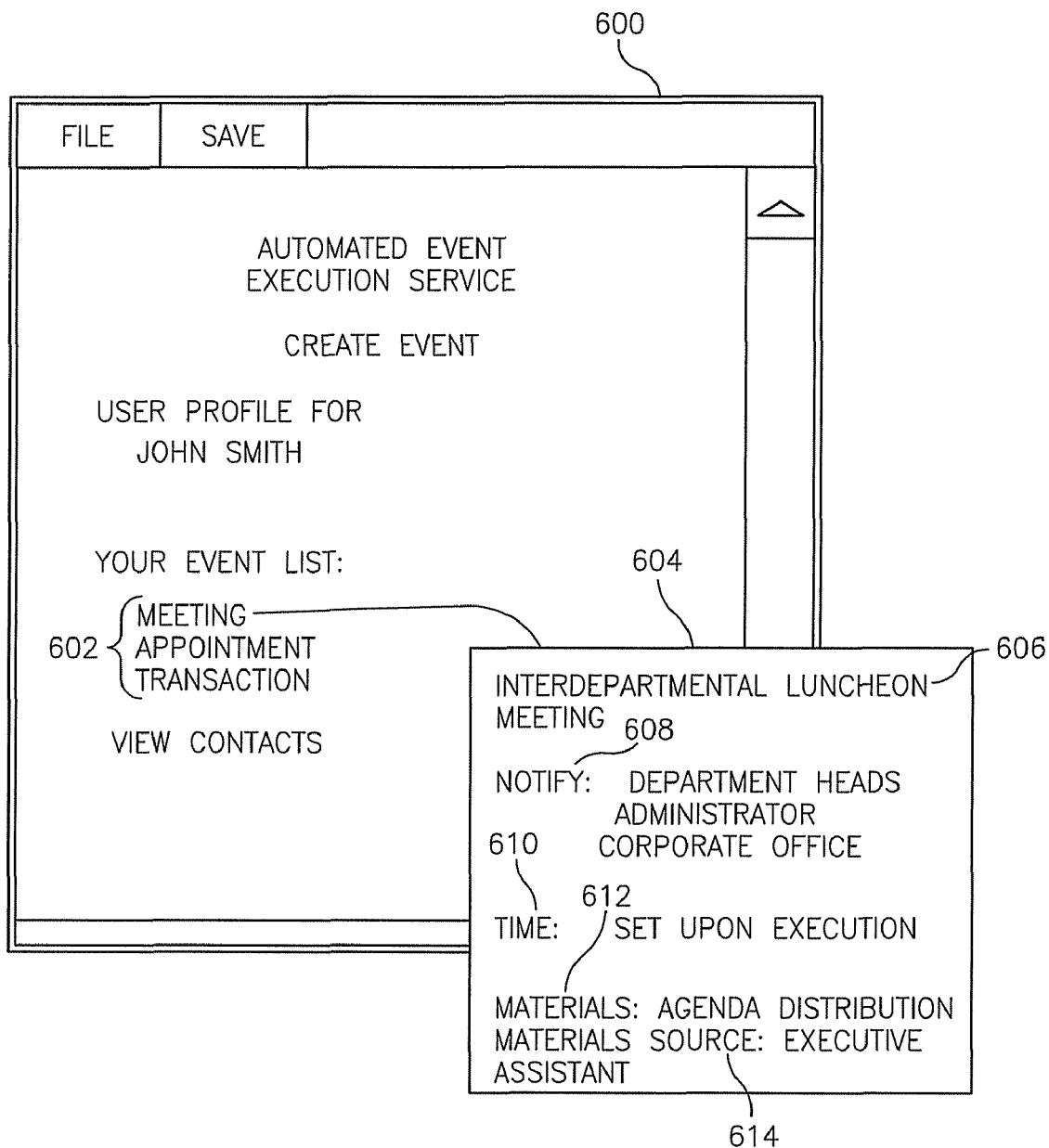
FIG. 6 is a sample screen display on a communications device illustrating how a user customizes and executes events in exemplary embodiments.

Once the profile has been created, the events are selected from a list of events (FIG. 5, 502-514) stored in event database 114 by selecting event types option 304 from main menu screen 300 at step 204. The subscriber defines the events to be executed at a future time as shown in FIG. 6. A unique command is associated with an event defined by the subscriber for identifying and distinguishing the event from other events that may be stored in the subscriber's pre-defined event list. The computer screen 600 of FIG. 6 illustrates an event list 602 that was selected by the subscriber. Events may include purchases, business and personal transactions, scheduling, messaging, and any other type of event that may be planned and executed via an electronic network. Examples of specific events include: messages, bill payments, calendar reminders, appointments, purchases, meetings, and invitations, to name a few.

The subscriber defines the event by selecting the desired event from event list 602. In the sample illustration of FIG. 6, the subscriber has selected 'meeting'. The automated event execution service displays a pop-up window 604 for further defining and/or executing an event. The subscriber defines the meeting as "Interdepartmental Luncheon Meeting" 606 in order to distinguish this meeting event from other meeting events that may be defined. The subscriber is queried to provide additional information about the event as shown in pop-up window 604. 'Notify' field 608 allows a subscriber to enter recipient contacts relevant to the event. The automated event execution service retrieves the communications address for these recipient contacts at the time of execution and transmits a notice to these contacts.

A target contact may also be selected by the subscriber. Using the example above, the meeting may require that a caterer or local restaurant provide lunch for the members at the meeting. The caterer is referred to as the target entity. Another target entity might be a conference center where the subscriber wishes to conduct the meeting.

Returning to the example in FIG. 6, a 'time' field 610 is provided that allows a user to select a time for the meeting or set the meeting time at a later point if desired. 'Materials' field 612 allows a subscriber to indicate whether materials will be presented before the meeting to the participants. Thus, an indicated in the above example, the automated event execution service has the capability to execute multiple transactions for a single event. The executable events, or event deliverables, for the meeting defined in FIG. 6 and the example referenced above include setting up a meeting, notifying participants, reserving a meeting room, booking a caterer, and distributing meeting materials to these participants. The execution of the materials event may further be defined by indicating the source of the materials (e.g., in this example, the executive assistant is a contact with information stored in customer profile database 112). A subscriber can create and execute an event via the event window of FIG. 6 or may save the event for later execution by accessing the automated event execution service and selecting 'execute an event' 306 at step 208.

The request to execute an event is received by the automated event execution service which causes the event to be executed. The request to execute an event may include a unique command that identifies the predefined event, an identifier for a target entity, an event recipient identifier, an event recipient communications address, and instructions for use in executing the event. The request may be sent via an electronic means or an audio communication means. The execution of the event may be performed by mapping a requestor's address to a personal identifier, retrieving a user profile based on the mapping, retrieving a pre-defined event list associated with the requestor based on the personal identifier, selecting an event requested for execution based on the unique command provided in the request, determining a target entity to which the request for event execution will be sent (based upon the unique command contained in the request), sending a request to the target entity to execute the event, and receiving confirmation from the target entity upon execution of the event at step (step 210).

Information sent to the target entity includes a request to execute the event. The request conveys instructions for executing the event and may include a personal identifier associated with the requestor, a requestor communications address, at least one event recipient address, and special instructions for use in executing the event. The personal identifier may be used by the target entity to conduct record keeping and subsequent billing of the requestor. The requestor's communications address may be used by the target entity for acknowledging successful receipt or completion of the event execution.

The event recipient address may be used by the target entity for sending the event deliverable. The event deliverable may include an electronic message, an audio message delivered to a destination addressable by means of a telephone number, or may be a tangible object or a service.

Embodiments of the automated event execution service contemplate other similar menu options as well as those depicted in FIGS. 3-6. As indicated above, the automated event execution service further allows a user to schedule an event for execution by voice or text means. Further, it will be understood that some of the data and functionality of the automated event execution service may be stored internally on communications devices 102-108 with resident memory.

As indicated above, the automated event execution service provides a means to select an event from a pre-defined set of events and receive acknowledgement upon its execution. A user may also customize the events to accommodate personal preferences and business requirements. The automated event execution service may be implemented using various communications methods including telephone, email, text messaging, or other communications means.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for providing automated execution of a pre-defined event, comprising:
   receiving a profile of a requestor responsive to a request to execute the pre-defined event;
   receiving the pre-defined events from the profile, the pre-defined event including a calendar reminder and a purchase transaction, the receiving the pre-defined events comprising:
      receiving a command operable for identifying the pre-defined event; and
      receiving an identifier for a target entity to which a request for execution of the pre-defined event will be sent, the target entity providing goods and services to a recipient, the goods and services subject to the purchase transaction;
   receiving a request to execute the pre-defined event; and
   executing the pre-defined event.

2. The method of claim 1, wherein the receiving the profile includes:
   providing the requestor with access to a database via a communications network;
   directing the requestor to enter data into data fields within the profile; and
   saving the profile in the database.

3. The method of claim 1, wherein the pre-defined event further includes:
   a message;
   a bill payment; and
   an appointment.

4. The method of claim 1, wherein the request to execute the pre-defined event includes
   the command operable for identifying the pre-defined event.

5. The method of claim 1, wherein the request is sent via an electronic means.

6. A system for providing automated execution of a pre-defined event, comprising:
   a host system; and
   an automated execution service executing on the host system, the automated execution service implementing a method, comprising:

receiving a profile of a requestor responsive to a request to execute the pre-defined event;

receiving the pre-defined event from the profile, the pre-defined event including a calendar reminder and a purchase transaction, the receiving the pre-defined event comprising:
- receiving a command operable for identifying the pre-defined event; and
- receiving an identifier for a target entity to which a request for execution of the pre-defined event will be sent, the target entity providing goods and services to a recipient, the goods and services subject to the purchase transaction;

receiving a request to execute the pre-defined event; and
executing the pre-defined event.

7. The system of claim 6, wherein the receiving the profile includes:
- providing the requestor with access to a database via a communications network;
- directing the requestor to enter data into data fields within the profile; and
- saving the profile in the database.

8. The system of claim 6, wherein the pre-defined event further includes:
- a message;
- a bill payment;
- an appointment;
- a meeting; and
- an invitation.

9. The system of claim 6, wherein the request to execute the pre-defined event includes:
- the command operable for identifying the pre-defined event.

10. The system of claim 6, wherein the request is sent via an electronic means.

11. A computer program product for providing automated execution of a pre-defined event, the computer program product comprising a non-transitory computer-readable storage medium having instructions embodied thereon, which when executed by a computer cause the computer to implement a method, the method comprising:
- receiving a profile of a requestor responsive to a request to execute the pre-defined event;
- receiving the pre-defined event from the profile, the pre-defined event including a calendar reminder and a purchase transaction, the receiving the pre-defined events comprising:
  - receiving a command operable for identifying the pre-defined event; and
  - receiving an identifier for a target entity to which a request for execution of the pre-defined event will be sent, the target entity providing goods and services to a recipient, the goods and services subject to the purchase transaction;
- receiving a request to execute the pre-defined event; and
- executing the pre-defined event.

12. The computer program product of claim 11, wherein the receiving the profile includes:
- providing the requestor with access to a database via a communications network;
- directing the requestor to enter data into data fields within the profile; and
- saving the profile in the database.

13. The computer program product of claim 11, wherein the pre-defined events further includes:
- a message;
- a bill payment;
- an appointment;
- a meeting; and
- an invitation.

14. The computer program product of claim 11, wherein the request to execute the pre-defined event includes the unique command operable for identifying the pre-defined event.

15. The computer program product of claim 11, wherein the request is sent via an electronic means.

16. The method of claim 1, wherein the profile includes an event recipient identifier operable for identifying an entity that is the object of the pre-defined event, wherein the entity is different from the requestor.

17. The method of claim 1, wherein the pre-defined event further includes:
- a meeting; and
- an invitation.

* * * * *